Figure 1:
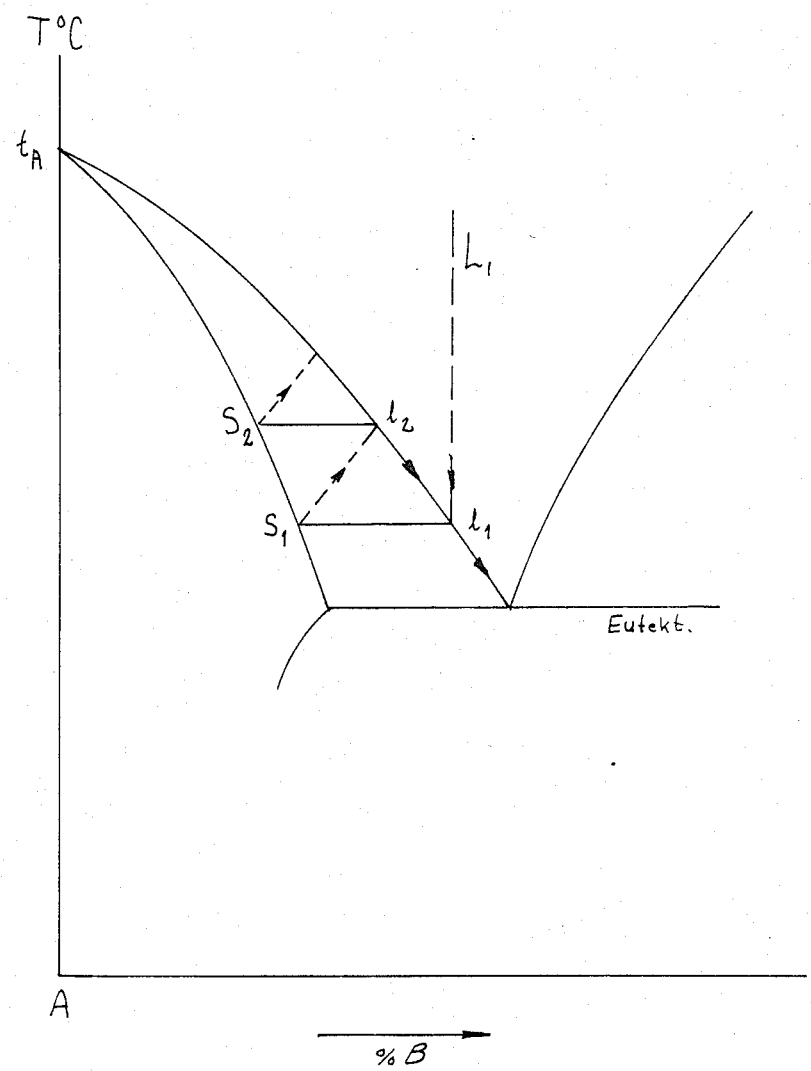

United States Patent [19]

Björling et al.

[11] Patent Number: 4,529,444
[45] Date of Patent: Jul. 16, 1985

[54] METHOD FOR SEPARATING SOLUTIONS

[75] Inventors: Karl G. E. Björling, Djursholm; Göran Lindkvist, Skelleftehamn, both of Sweden

[73] Assignee: Boliden Aktiebolag, Stockholm, Sweden

[21] Appl. No.: 581,193

[22] Filed: Feb. 17, 1984

[30] Foreign Application Priority Data

Mar. 15, 1984 [SE] Sweden ............................ 8301416

[51] Int. Cl.$^3$ ................................................ C22B 9/02
[52] U.S. Cl. .......................................... 75/63; 62/532; 260/707; 585/812; 23/306
[58] Field of Search ................. 75/63, 79; 260/707; 62/532; 585/812; 23/306

[56] References Cited

U.S. PATENT DOCUMENTS

| | | | |
|---|---|---|---|
| 2,750,262 | 6/1956 | Pfann | 75/63 |
| 3,239,899 | 3/1966 | Johnson | 75/63 |
| 3,400,548 | 9/1968 | Drayer | 260/707 |
| 4,231,757 | 11/1980 | Herzer et al. | 62/532 |

Primary Examiner—Melvyn J. Andrews
Attorney, Agent, or Firm—Burns, Doane, Swecker & Mathis

[57] ABSTRACT

The invention relates to a method for continuously separating a hypoeutectic solution into two parts, of which parts, one comprises practically pure solvent and the other a solution which has a higher content of the dissolved substance than the original solution. In accordance with the invention, the starting solution is held in an elongate vessel at a temperature, which, at least at one end of the vessel, lies immediately above the melting point of the solvent, and cooling elements are caused to move in the vessel towards said one end thereof. The temperature of said cooling elements is alternated to levels above and beneath the liquidus temperature of the solution, so that said elements are alternately coated with a layer of frozen solvent having a lower content of the dissolved substance than the ambient solution, and freed from said coating by melting the coating in a warmer region of the solution, wherewith more solvent than dissolved substance is constantly transported to said one end of the vessel, and the residual solution enriched in the dissolved substance is forced in counterflow towards the other end of said vessel. Solvent and enriched solution is tapped from respective ends of the vessel, while charging to said vessel furthersolution, at a location where the concentration of the solution is the same as that of the starting solution, thereby to maintain a steady state in the system.

The ingoing solution may be a metal alloy, in which case it is divided into two metal melts; an aqueous solution in which case it is divided into water and a more concentrated aqueous solution; or an organic solution, in which case it is divided into a solvent and a more concentrated organic solution.

6 Claims, 3 Drawing Figures

METHOD FOR SEPARATING SOLUTIONS

The present invention relates to a method of continuously separating a hypoeutectic solution into two parts, of which parts, one is a practically pure solvent and the other is a solution having a higher content of the dissolved substance than the original solution.

Thus, in general terms the invention can be applied for separating hypoeutectic solutions of a substance B in a solvent A. However, since the origin of the invention lies within its applications in the metallurgical field, and particularly in the refinement through separation of a contaminated melt, or the division of an alloy in order to concentrate the alloying metal in a small part of the base metal present, the invention will be described, at least initially, with particular reference to metallic solution systems. Thus, the method according to the invention can be applied for refining metals with respect to elements which are more noble than the actual metal itself, these elements, together with the metal, forming a eutectic and being present in the starting material in amounts smaller than those corresponding to the composition of the eutectic. Elements of a more noble nature cannot be separated from metals by selective reaction processes, such as oxidation, which is otherwise a simple, conventional separation method when refining both iron/steel and non-ferrous metals. Consequently, in order to separate out the more noble elements, it is necessary to develop other, more sophisticated refining methods, when desiring to refine metals with respect to these elements.

It is a well known fact, and also one used in practice, that the crystals separated from a hypoeutectic melt of a metal alloy contain a lower content of the alloying metal, and thus afford the possibility of purifying the base metal or of concentrating the alloying metal in a melt of up to eutectic composition. Thus, it has previously been possible to free lead of silver and to concentrate silver from a lead melt by the so-called Pattison method, in which method a lead bath which contains silver is allowed to solidify partially, therewith to separate out the lead in a purer form, while the silver is concentrated in the molten residue. Subsequent to tapping of this residue, the residue is repeatedly subjected to the same process until a eutectic lead-silver alloy containing about 2.5% Ag is obtained, from which pure silver can be produced after expelling the lead. The purer lead crystals are melted and treated in a similar manner, so that after repeating the process a number of times, a lead free from silver is obtained. This method, however, is highly uneconomical and impracticable, due to the high levels of energy consumed and the large amount of work entailed, and has long since been discarded in favour of Parkes' method for de-silvering lead, by adding zinc. This method, however, is also highly complicated and difficult to adapt to present day requirements with respect to high quality and a good working environment.

It is possible, however, to apply the same principle for the separation of metals as that applied in the Pattison process, but in a manner which requires less complicated apparatus.

One such method is described in our earlier International application No. WO 83/00166, according to which cooling elements having a temperature immediately beneath the liquidus temperature are caused to move in a molten bath having a slightly higher temperature. A concentration gradient is maintained in the bath, in the longitudinal direction of the vessel, so that the cooling elements move through a progressively purer melt. Crystals which freeze onto the cooling elements will therewith change composition, and the purity of the crystals is increased through outward diffusion of the alloying metal. The crystals are melted from the cooling elements at the pure end of the bath, and then returned to the other end thereof, i.e. the eutectic end. Thus, the process relies upon a maintained temperature differential between the bath and the cooling elements, and also on a not-readily controlled diffusion within the solid phase, and is consequently not particularly attractive, except in the case of special applications, when it is desired to approach the eutectic composition of the molten bath in which the alloying element is concentrated.

An object of the present invention is to provide a method of the aforedescribed kind which although the Pattison principle is applied, does not have the disadvantages hitherto associated with such processes, and which can also be applied to all hypoeutectic solutions. To this end, the invention is characterized by the steps set forth in the following claims.

The principles on which the invention is based will be better understood from the following general discussion of the application of the invention on a general eutectic system of a base substance A and another subtance B dissolved therein. The requirements are that A and B form a eutectic phase diagram of the kind shown in the accompanying FIG. 1, and that a solution, which may be a molten alloy, is found in a horizontal vessel, and that the solution is maintained at a temperature slightly above the melting point of A, at least at one end of the vessel. In other respects, no requirement is placed on temperature, other than that the temperature of the solution shall lie above the liquidus temperature, i.e. the temperature given by the upper curve of the phase diagram in FIG. 1.

The solution in the vessel is held at mutually different concentrations in respective areas of said vessel. At one end of the vessel, referred to as the pure end, there is practically no B in the solution, while at the other end of the vessel, the so-called impure end, the solution contains a relatively large amount of B, although this amount lies beneath the eutectic composition. Between the two ends of the vessel, a concentration gradient is maintained in a manner hereinafter made apparent.

At a given location in the vessel, the composition $l_1$ of the solution is in accordance with the phase diagram of FIG. 1. By lowering a cooling element into this given location of the vessel, crystals of composition $s_1$ will freeze onto said element. The cooling element with the crystals frozen thereon is moved slowly towards the pure end of the vessel, during which movement the crystals melt from said element and form a melt of composition $l_2$. In the proximity of the location at which the crystals melt, there is provided a further cooling element, onto which crystals of composition $s_2$ now freeze, whereafter the described sequence can be repeated a number of times further up the vessel, with further cooling elements nearer the pure end. Since crystals having a lower B-content than the surrounding solution are conveyed constantly towards the pure end of the vessel, the remaining solution of higher B-content is necessarily displaced in the opposite direction. Since the entire vessel is full of such cooling elements, all of which move in mutually the same direction, the bath will adopt the desired composition gradient, with a practically pure solution at one end thereof and at the other end a solution which contains more of the dissolved substance than did the original solution, and the gradient can be maintained despite a tendency towards equilibrium, through natural diffusion processes. The solution to be separated out may now continually float into the horizontal, preferably elongate vessel at the location where the solution has a corresponding composition. So as not to disturb the temperature equilibrium, and therewith the rate at which the crystals melt from the cooling elements, the temperature of the input solution should be held at the same temperature as the solution in the vessel. A given part of the practically pure solvent A, roughly half, transported to the pure end of the vessel can be removed continuously therefrom, while a quantity of solution enriched in B and corresponding to the amount of pure A-solution removed can be tapped from the impure end of the vessel. Not all the amount of A transported to the pure end should be removed therefrom, since sufficient liquid should be left to flow back to the impure end of said vessel, in order to sustain a uniform flow of liquid in counter-flow to the crystals transported on the cooling elements.

Figure 2:
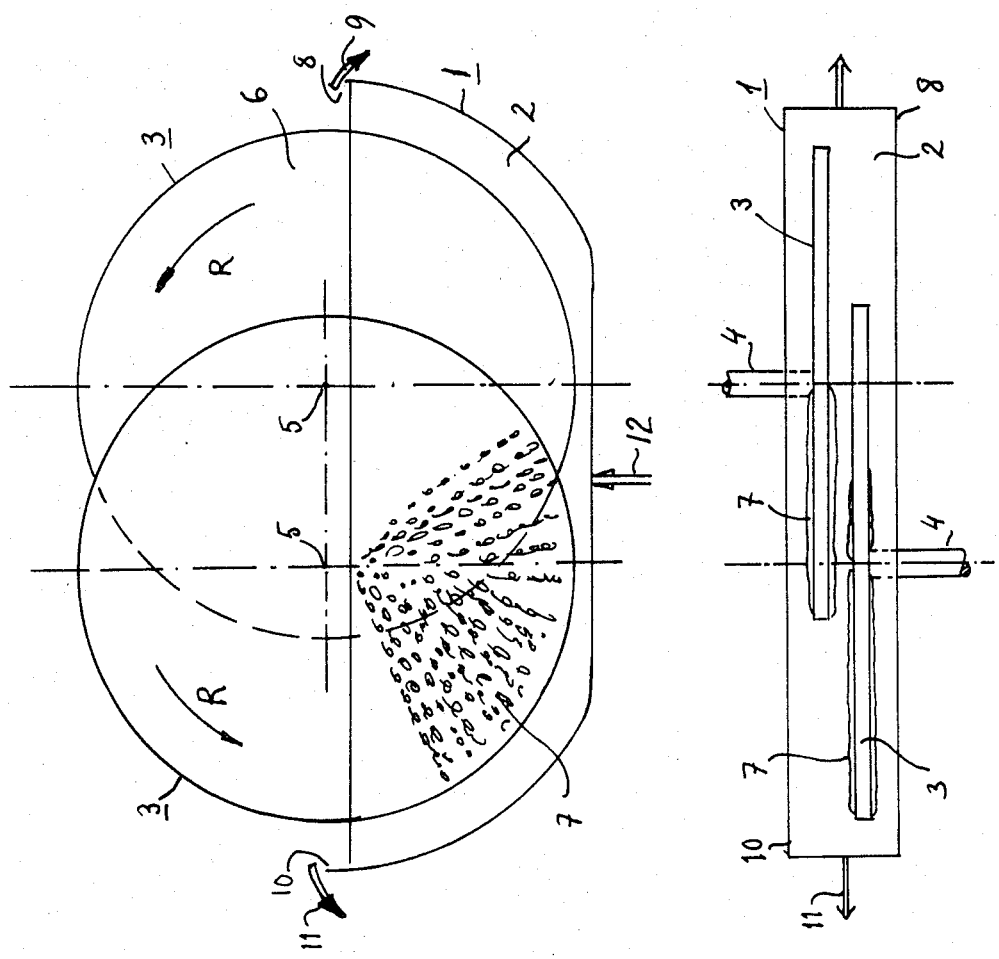
Figure 3:
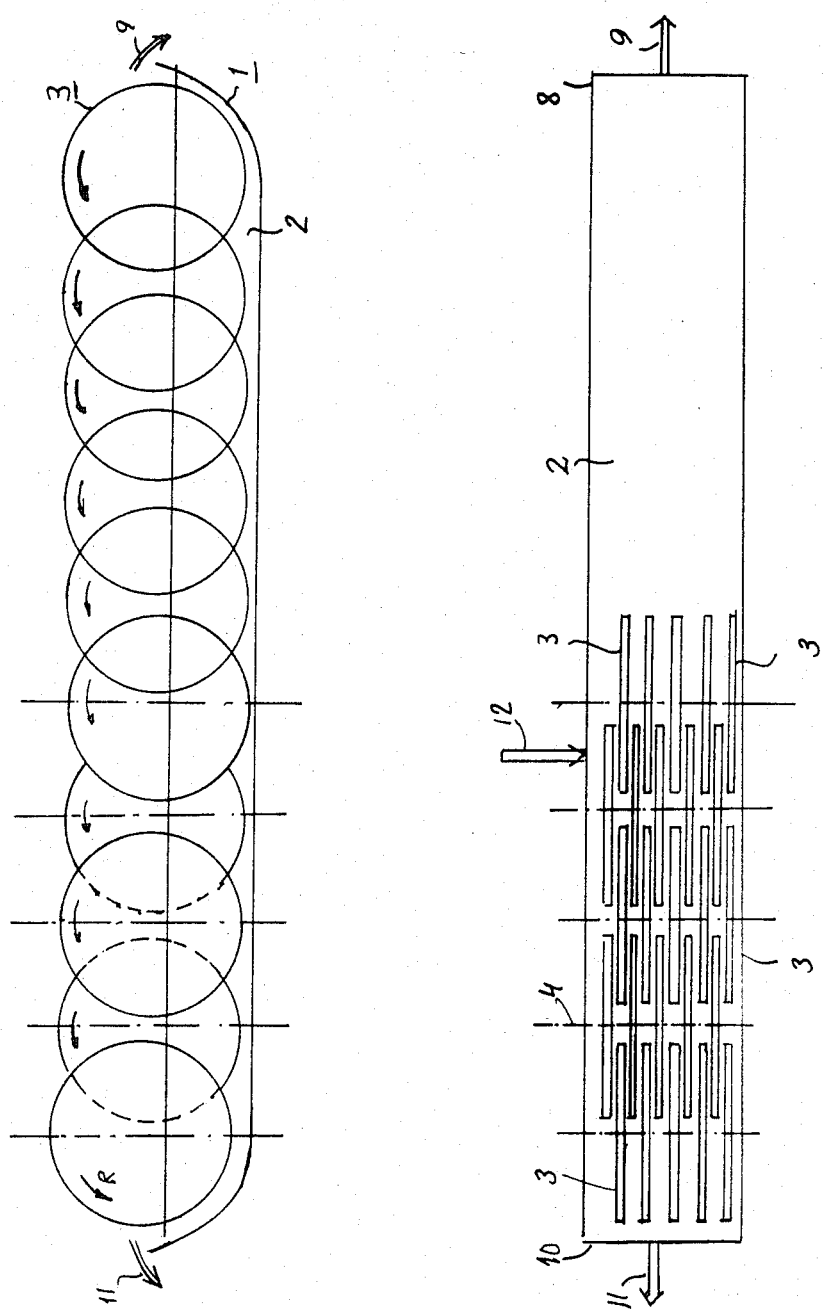

The invention will now be described in more detail with reference to a number of preferred embodiments, and with particular reference to one working example and to the accompanying drawings, in which FIG. 1, as beforementioned, is a general phase diagram of a eutectic system A-B;

FIG. 2 illustrates in plan view and in side view the principle upon which the invention is based, when separating a solution into two parts; and FIG. 3 illustrates in plan view and in side view a basic apparatus for separating a solution into two parts, in accordance with the invention.

The invention can take many forms in practice. In accordance with one embodiment of the invention, cooling elements, which may be tubular or flat, are caused to move slowly along the whole length of the vessel, towards the socalled pure end thereof. The cooling elements are alternately cooled and heated, for example by means of a medium which flows through said elements, so as to cause crystals to form on said elements and to subsequently melt therefrom. The simplest method of cooling the elements is to blow a gas therethrough, and the elements can be heated by taking heat from the bath. Preferably at least two systems of cooling elements are provided, which effect a separate heat-exchange and between which a temperature differential is maintained, so as to enable crystals from the solution formed when melting crystals from the cooling elements of one system, to be formed on a nearby cooling element belonging to another system. Subsequent to the crystals having melted from those cooling elements which have reached the pure end of the vessel, said cooling elements are lifted from the solution and returned, externaly of the vessel, to the impure end thereof, to then pass again through said vessel.

The cooling elements can also be arranged to move forwards and backwards in the solution, said elements first moving forwards in a cool state with crystals frozen thereon, and then in a warmer state with the crystals melting therefrom, until reaching the pure end of the bath, whereupon the cooling elements are returned in the opposite direction. When using this embodiment, a single system of cooling elements is sufficient. With this embodiment however, there is a risk of turbulence in the solution, and if turbulence does occur, it is more difficult to maintain the concentration differentials in the various parts of the vessel. The cooling elements from which all crystals have melted can also be returned to the impure end of the vessel externally therof, and in both embodiments the vessel may advantageously have the form of a trough, either in a straight form or a curved form, e.g. a circular form.

In another particularly preferred embodiment, described hereinafter with reference to the purification of a molten bath, the cooling elements comprise slowly rotating, substantially vertical members, which are immersed to almost half their height into the bath and which in FIGS. 2 and 3 are shown to be cylindrical discs. The discs are arranged to rotate so that that part thereof immersed in the bath moves towards the pure end of the vessel. In FIG. 2, the reference 1 identifies an elongate trough which contains a molten bath 2. Two cylindrical discs 3 are shown partially immersed in the bath. The discs 3 are carried on shafts 4 and are arranged to rotate on the shafts, at the centres 5 of the discs, as shown by the arrows R. That part 6 of a disc 3 protruding above the surface of the bath 2 is cooled by a gaseous cooling medium, to a temperature such that a layer 7 of metal crystals will freeze onto said part when it is rotated down into the bath 2. As soon as the immersed part of the disc is heated through the release of fusion heat, this freezing-out of crystals will cease, and the crystals will soon thereafter melt from the cooling elements, under the influence of the somewhat warmer ambient melt. During this sequence of events, the disc 3 has moved towards the pure end 8 of the trough 1, and the intended transport of the base metal to the pure end of the vessel has been accomplished. The speed at which the upper part 6 of the disc 3 rotates and the temperature to which it is chilled are adapted so that all crystals have fully melted from the disc just as it is about to leave the bath 2. In this way there is obtained an outflow of purified metal on the pure side 8 of the trough 1, as shown by the arrow 9, while impure metal flows out from the impure side 10 of said trough, as illustrated by the arrow 11. Although not shown, the discs 3 may be provided with apertures, thereby to improve communication with the molten solution on different sides of the discs, and to increase the specific contact surface-area thereof. The melt to be purified is supplied to the trough at a temperature equal to the temperature of the bath 2 at that trough location at which the composition of the melt is the same as that of the melt supplied. In the illustrated embodiment, this introduction of the melt to be purified is indicated by the arrow 12.

As illustrated in FIG. 3, in a fully operational plant the discs 3 may be arranged in groups, one group on a respective horizontal shaft, with all discs parallel with one another, so as to fill the entire trough 1. For the sake of simplicity, the top plan view of FIG. 3 only shows the trough filled to half its length. The discs of one group overlap the discs of an adjacent group, so that the metal crystals which have melted from the discs of one group immediately come into contact with a cold disc in the next following group, and are able to form thereon the intended purer crystal coating. Since all the discs rotate in the same direction, the base metal is conveyed to the pure end 8 of the trough 1 as intended.

Although the thermal capacity of the discs can be increased by making the discs thicker, thereby enhancing the ability of the discs to take the requisite solidifying temperature, it is possible that heat will be conducted away tangentially from discs of pronounced thickness, which is not to be desired. Consequently, it may be advantageous to replace the discs with other rotatable members, having rods or tubes which extend radially from a centre hub, as with a rimless spoked wheel.

In the following example, the invention will be described with reference to the continuous de-silvering of lead, the invention being well suited to this highly important metallurgical application. Examples of other metallic systems for which refinement by separation in accordance with the invention is well suited, particularly as hitherto known methods are both expensive and laborious, include the removal of bismuth from lead and of cadmium from zinc, and the removal of iron and silicon from crude aluminium, and the concentration of precious metals in copper, so that only a minor part of the copper need be subjected to expensive electrolytic refinement processes. The present invention can also be used to produce low-oxygen copper, and to highly refine silicon to the socalled solar grade. When applying the invention to these ends, and also for the purpose hereinafter mentioned, the cooling elements and the coolant are chosen respectively with respect to the nature of the melt and of the solution, such that when processing molten copper or aluminum for example, the cooling elements may be made of graphite while circulating, for example, an inert gas, such as nitrogen, as the coolant. In the case of silicon refinement, the cooling elements may be made of silica.

In addition to processing metallic systems, in which the solvent component of the solution in a molten metal, the invention can also be applied to advantage for separating out for example, an aqueous solution into water and a more concentrated solution, e.g. for the desalination of sea water, all within the scope of the claims. Further, in accordance with the method, organic solutions, i.e. solutions containing an organic solvent, can be divided into solvent and more concentrated solution. This embodiment of the invention can therewith be applied for the purification by recrystallization, a methodology which is of particular interest within the technical fields of pharmacology and petrochemistry.

EXAMPLE

The method according to the invention was carried out in practice with the use of rotatable discs, in accordance with the FIG. 3 embodiment. The trough had a length of 6 meters, a width of 0.65 m and a bath depth of 0.25 m. The discs were made of low-carbon steel and were 0.6 m in diameter. The discs were placed in groups of eight, and there was a total of sixteen groups. The discs were parallel to one another and were rotated at a speed of 1 r.p.m.

The process concerned the separation of silver-containing lead having a silver content of 857 g/ton, into its component parts. The temperature of the trough was 331° C. Air was blown onto the upper parts of the discs, so as to cool the same to a temperature at which a layer of metal froze to said upper disc parts, to a thickness of about 2.5 mm, this frozen layer melting from the discs in the bath. It was calculated that about 45 kg of pure lead was transported each minute, of which quantity half was tapped off at the pure end of the vessel, said lead having a silver content of about 1.5 g/ton, while a silver-rich lead containing 10270 g/ton Ag was tapped off at the impure end of the vessel. For each ton of alloy, there was removed 923 kg of de-silvered lead and 77 kg of lead rich in silver. The plant had a capacity of 1.35 tons per hour, and 76 kWh energy were consumed per ton of input alloy.

We claim:

1. A method for continuously separating a hypoeutectic solution comprised of a solvent and a dissolved substance solution into a first part comprising substantially pure solvent and a second part having a higher content of the dissolved substance than the original hypoeutectic solution, said method comprising:
   (a) introducing the hypoeutectic solution into an elongate vessel at least one end of which is maintained at a temperature immediately above the melting point of the solvent, said elongate vessel being provided with a plurality of rotatable, substantially vertical disks having axes of rotation substantially transverse to the length of the elongate vessel, said disks being immersed in the solution in the elongate vessel to approximately half their height;
   (b) cooling the portions of the disks which protrude above the surface of the solution with a gaseous medium whereby as the disks are rotated they are coated with a layer of frozen solvent having a lower content of the dissolved substance than the ambient solution which layer transported to a different, warmer portion of the solution by the rotation of the disks whereby the layer is melted and more solvent than dissolved substance is transported toward said one end of the elongate vessel and the residual solution enriched in the dissolved substance flows countercurrently towards the other end of the elongate vessel;
   (c) removing substantially pure solvent from said one end of the elongate vessel; and
   (d) removing solution having a higher content of the dissolved substance from the other end of the elongate vessel
wherein the introduction of the hypoeutectic solution into the elongate vessel is selected such that concentration of the introduced solution is substantially the same as the solution in that location of the elongate vessel.

2. The method of claim 1 wherein the hypoeutectic solution is a metal alloy which is separated into two metal melts having different compositions.

3. The method of claim 1 wherein the hypoeutectic solution is an aqueous solution which is separated into water and a more concentrated aqueous solution.

4. The method of claim 1 wherein the hypoeutectic solution is an organic solution which is separated into a solvent and a more concentrated organic solution.

5. The method of claim 1 wherein the rotatable disks are arranged in the elongate vessel such that the periphery of the disks along one axis of rotation overlaps the periphery of the disks along the adjacent axis of rotation.

6. The method of claim 1 wherein the hypoeutectic solution is comprised of lead as the solvent and silver as the dissolved substance.

* * * * *